July 15, 1958     C. L. WELTNER     2,842,979
REMOTE CONTROL DEVICE

Filed May 8, 1956     2 Sheets-Sheet 1

INVENTOR.
CHARLES L. WELTNER
BY
ATTORNEY

July 15, 1958 — C. L. WELTNER — 2,842,979
REMOTE CONTROL DEVICE
Filed May 8, 1956
2 Sheets-Sheet 2

INVENTOR.
CHARLES L. WELTNER
BY
ATTORNEY

United States Patent Office 2,842,979
Patented July 15, 1958

2,842,979
REMOTE CONTROL DEVICE
Charles L. Weltner, Atlanta, Ga.
Application May 8, 1956, Serial No. 583,407
15 Claims. (Cl. 74—471)

This invention relates to a remote control device and is particularly concerned with a control device which may impart both mechanical motion and fluid pressure variations from the device to remotely positioned instrumentalities to be controlled.

While the present inventive concept may have many advantageous uses in the control of a wide variety of apparatus, it is here presented as for the remote control of steering and braking as motor control functions, as for instance for boats or motor vehicles, and it may be adapted for use in the control of tethered miniature airplanes. While many types of control devices have long been generally accepted and widely used, such devices have usually been either of a mechanical nature providing for the transmission solely of mechanical movement or they have been purely pressure operated providing for control through variations of that fluid pressure. In either instance, it is of course obvious that only one type of control may be provided through one remote control means. Thus, when it is desired to remotely control the steering of a boat or vehicle, the remote means could not at the same time control some other function such as braking or throttling or the like. Where such devices have been conceived in an attempt to provide multiple functions of a single control instrument the devices have been complicated, expensive and delicate. Furthermore, in the operation of such complicated mechanism, faithful response to the control impulse has not been achieved.

It is, therefore, among the primary objects of the present invention to provide a novel and improved remote control device operable to remotely control a plurality of functions of the instrumentality to which the control is associated.

A further object of the present invention is to provide a control means which will impart both mechanical motion and fluid pressure variations.

Another object of the present invention is to provide a simple, convenient, manually operable remote control device of such design and construction as to readily fit the hand of the user in such manner as to permit full operation thereof by only one hand.

It is also an object of the invention to provide a device of the character described through the operation of which a pair of cables may be equally and oppositely moved through the pivoted movement of a single element and therewith to provide for pressure variations as a result of the bodily movement of the same element.

Numerous other objects, features and advantages of the invention will be apparent upon consideration of the following specification taken in conjunction with the accompanying drawings in which.

Figure 1:
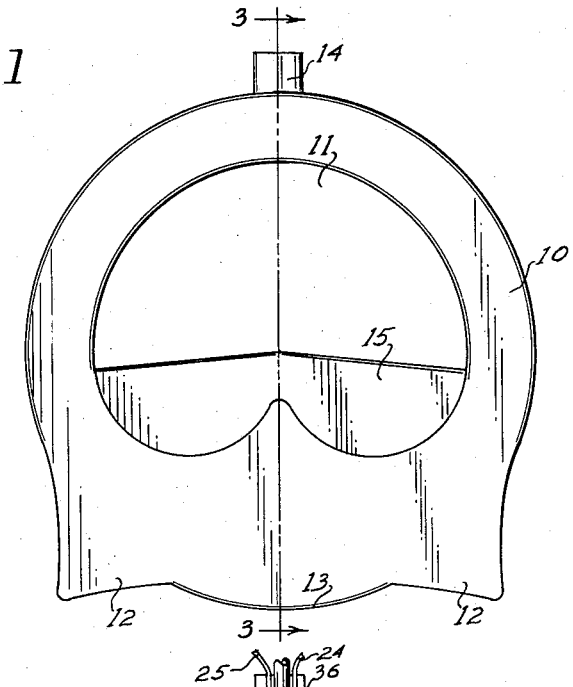
Fig. 1 is a side elevation of one embodiment of the present invention.
Figure 2:
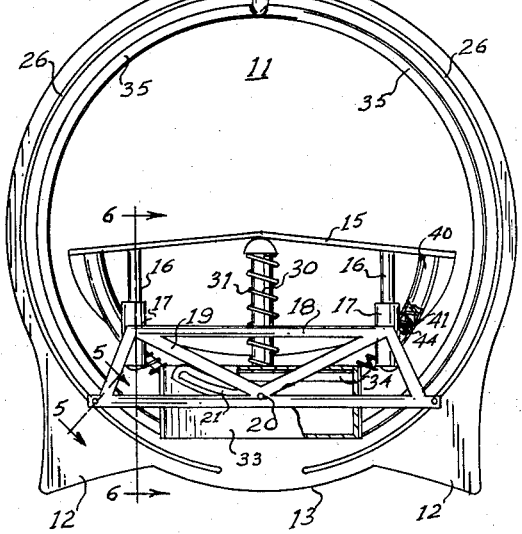
Fig. 2 is a side elevation of the device of Figure 1 with the cover removed vertical longitudinal cross-section through the device as depicted in Fig. 1.
Figure 3:
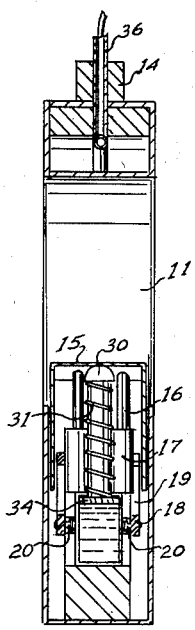
Fig. 3 is a vertical transverse cross-section taken on the line 3—3 of Fig. 1.
Figure 4:
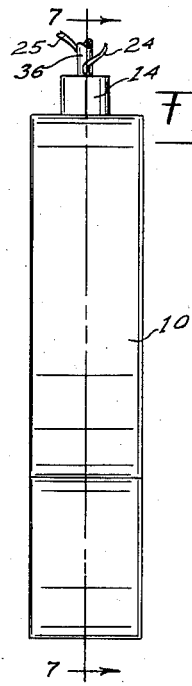
Fig. 4 is a side elevation of the device.
Figure 5:
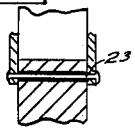
Fig. 5 is a detailed cross-sectional view taken on the line 5—5 of Fig. 2.
Figure 6:
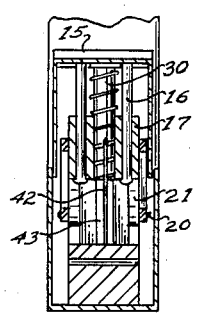
Fig. 6 is a cross-section taken on the line 6—6 of Fig. 2.
Figure 7:
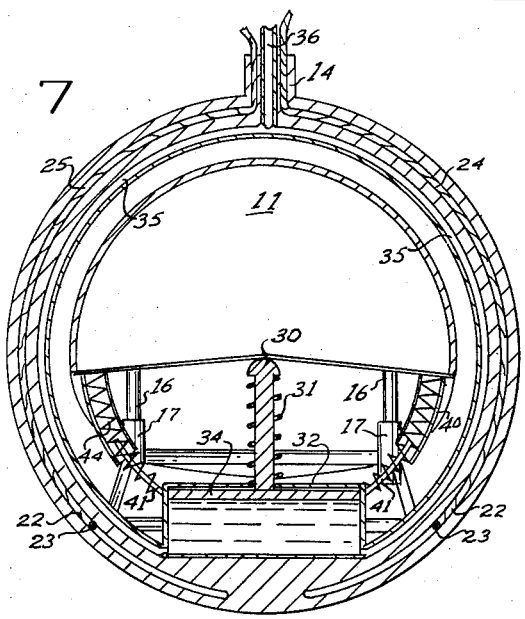
Fig. 7 is a cross-sectional view taken on the line 7—7 of Fig. 4.

While the present inventive concept may be embodied in a wide variety of designs and with various mechanical equivalents, that form of the invention here presented by way of illustration may be generally defined as comprising an annular casing through which the hand of the operator may pass and in which there is mounted for both pivotal movement and bodily movement a control member. The bodily movement of the control member is adapted to press a plunger against the tension of a spring. The end of the plunger engages a piston within a fluid cylinder so that as a result of such bodily motion pressure may be applied to a fluid and through a fluid tube extending from the device to the instrument to be controlled. Thus in response to variations in pressure changes the setting of mechanical mechanisms may be affected, as for instance the application or release of brakes or the adjustment of the carburetor setting of an engine. In addition to bodily movement, the control member is pivotally mounted and through suitable interconnecting mechanism the pivotal movement is transmitted to a pair of parallel cables which are thus to be moved in equal and opposite directions as a result of the pivotal movement. It will, of course, be understood that such cables may lead to the same instrumentality to which the pressure tube is connected, and hence the instrumentality may be doubly controlled both by fluid pressure and by mechanical movement. In the use of the device with a motor vehicle or boat, the cable movement may actuate the steering mechanism.

Referring now to the specific structural details as presented by the drawings, it will be seen that this form of the invention includes an annular casing 10 generally U-shaped in construction and defining a central aperture 11 which may receive the hand of the operator. For convenience of grip, it is preferred that the bottom of the casing 10 be formed with spaced, inclined areas 12 joined by intermediate curved area 13. At the opposite and upward edge of the casing 10, a nipple 14 is provided through which the cables and the pressure tube hereinafter referred to may lead from the instrument to the apparatus to be controlled.

Mounted within the casing and extending across a portion of the aperture 11 so as to readily respond to motion of the hand extending therethrough, there is an operating plate 15 supported adjacent its opposite sides by plungers 16, slideably mounted within cylinders 17; the cylinders 17 are in turn secured as by welding to a pivoted bridge structure including upper and lower bridge beams 18 joined by angular supporting bracings 19 and supported on a guide pin 20. In the form of the invention here shown, a bridge member is depicted as mounted on either side of the cylinders. By this arrangement it will be seen that the bridge structure and hence the plate 15 are thus supported for rocking motion through the connection of the rigidly attached cylinders 17 and the slideable plungers 16. Pivot pin 20 for the bridge structure is mounted for arcuate motion within an arcuate guide 21, the arrangement thus being such that upon depression of one side or the other of the member 15 the member will rock about a pivotal point which is in the center of the curvature of the arcuate groove 21 within which pin 20 moves. The opposite outer ends of the lower bridge beam 18 engage the terminal ends of oppositely disposed parallel cables 22 by cross pins 23, the arrangement being such that the cross pin 23 between the opposite ends of the parallel beams traverses an arcuate slot at the lower end of the casing, and from this slot the cables 24 and 25 extend through channels 26 to emerge through the nipple 14 as a pair of parallel oppositely moving control cables.

For controlling the pressure of fluid, preferably a liquid, there is disposed under the member 15 a central plunger 30 encircled by a spring 31 and extending downwardly through the top cover 32 of a fluid chamber 33 and connected within the chamber with a piston 34 so that as the plate 15 is bodily depressed the piston will be forced downwardly in the chamber 33 to exert pressure on the fluid therein. The chamber 33 is connected by arcuate fluid passageways 35 which pass parallel with the channels 26 upwardly into nipple 14 where they are connected in similar manner with a pressure tube 36 leading to the equipment which is to be controlled, preferably by both the cables 26 and the variations of fluid pressure.

For additionally supporting the plate 15 and for accommodating it for both pivotal and bodily motion, and for restraining it to a normal position, there is provided at each end thereof an arcuate cylindrical guide tube 40 which slideably receives therein an arcuate guide member 41 which in turn has its lower portion provided with a head 42 mounted within a vertical guide 43 located on the opposite ends of the pressure chamber 33. There is also provided an encircling coil spring 44 which surrounds the arcuate rod 41 so as to normally urge the associated guide tube upwardly with respect to the pressure chamber 33. It will, of course, be understood that the headed end 42 of the rod 41 may slide vertically in the guide 44 so as to permit bodily movement of the plate 15. It will also be noted that with or independently of the bodily movement of the plate 15, the arcuate guide arrangement will permit a tilting of the plate 15 so as to move the bridge member ends in their arcuate guide thus imparting a companion movement to the cables.

From the foregoing it will be seen that the present invention provides a unitary, simple, effective and efficient remote control means for jointly imparting equal and opposite lineal movement to control cables and for applying pressure variations to the instrumentality to be controlled. It will be seen that the device may be readily grasped by one hand of the operator which extends through the casing and engages the plate 15. Plate 15 may be pivotally moved from side to side to affect lineal movement of the pulleys and cables, and such movement is restrained by the coil springs in the arcuate guides so as to normally maintain a mid-position of the plate. It will also be seen that the plate may be bodily moved downwardly, either independently of the pivotal movement or in conjunction with pivotal movement to depress the piston within the pressure chamber 33 and thus to induce a fluid pressure in the annular chamber 35 and through the pressure tube 36 to the controlled device.

In the construction of the invention it will be understood that numerous changes, modifications and the full use of equivalents may be resorted to without departure from the spirit or scope thereof as defined in the appended claims.

I claim:

1. A control device for imparting mechanical motion and fluid pressure variations including, a casing, a control plate mounted in said casing for bodily movement and pivotal movement independent of said bodily movement, a control cable engaging said plate to be moved by pivotal movement thereof, and a pressure chamber including means responsive to bodily movement of said plate to vary the pressure in said chamber.

2. A control device for imparting mechanical motion and fluid pressure variations including, a casing, a control plate mounted in said casing for bodily movement and pivotal movement independent of said bodily movement, a control cable engaging said plate to be moved by pivotal movement thereof, and a pressure chamber including means responsive to bodily movement of said plate to vary the pressure in said chamber, said means including a piston within said chamber and a rod engaging said piston and said plate.

3. A control device for imparting mechanical motion and fluid pressure variations including, a casing, a control plate mounted in said casing for bodily movement and pivotal movement independent of said bodily movement, a control cable engaging said plate to be moved by pivotal movement thereof, and a pressure chamber including means responsive to bodily movement of said plate to vary the pressure in said chamber, said means including a piston within said chamber and a rod engaging said piston and said plate, said rod being spring urged to normally maintain said piston at a minimum pressure position within said chamber.

4. A control device for imparting mechanical motion and fluid pressure variations including, a casing, a control plate mounted in said casing for bodily movement and pivotal movement independent of said bodily movement, a control cable engaging said plate to be moved by pivotal movement thereof, and a pressure chamber including means responsive to bodily movement of said plate to vary the pressure in said chamber, said means including a piston within said chamber and a rod engaging said piston and said plate, said rod being spring urged to normally maintain said piston at a minimum pressure position within said chamber, said chamber having a pressure tube leading therefrom with said control cable.

5. A control device for imparting mechanical motion and fluid pressure variations including, a casing, a control plate mounted in said casing for bodily movement and pivotal movement independent of said bodily movement, a control cable engaging said plate to be moved by pivotal movement thereof, and a pressure chamber including means responsive to bodily movement of said plate to vary the pressure in said chamber, said means including a piston within said chamber and a rod engaging said piston and said plate, said rod being spring urged to normally maintain said piston at a minimum pressure position within said chamber, said chamber having a pressure tube leading therefrom with said control cable, the plate being mounted for alternate or simultaneous pivotal and bodily movement.

6. A remote control device including an annular casing defining a hand receiving opening, a plate transversing said opening mounted for independent pivotal and bodily movement, a pair of oppositely extending cables connected with said plate to be equally and oppositely moved in response to pivotal movement of said plate, and a fluid pressure device responsive to bodily movement of said plate.

7. A remote control device including an annular casing defining a hand receiving opening, a plate transversing said opening mounted for independent pivotal and bodily movement, a pair of oppositely extending cables connected with said plate to be equally and oppositely moved in response to pivotal movement of said plate, and a fluid pressure device responsive to bodily movement of said plate, said cables extending through the annular rim of said casing to emerge therefrom above said plate.

8. A remote control device including an annular casing defining a hand receiving opening, a plate transversing said opening mounted for independent pivotal and bodily movement, a pair of oppositely extending cables connected with said plate to be equally and oppositely moved in response to pivotal movement of said plate, and a fluid pressure device responsive to bodily movement of said plate, said cables extending through the annular rim of said casing to emerge therefrom above said plate, said fluid pressure device including a piston actuated by bodily movement of said plate.

9. A remote control device including an annular casing defining a hand receiving opening, a plate transversing said opening mounted for independent pivotal and bodily movement, a pair of oppositely extending cables connected with said plate to be equally and oppositely moved in response to pivotal movement of said plate, and a fluid pressure device responsive to bodily movement of said plate, said cables extending through the annular rim of said casing to emerge therefrom above said plate, said fluid pressure device including a piston actuated by bodily movement of said plate, and pressure transmitting tubes leading from said fluid pressure device.

10. A remote control device including an annular casing defining a hand receiving opening, a plate transversing said opening mounted for independent pivotal and bodily movement, a pair of oppositely extending cables connected with said plate to be equally and oppositely moved in response to pivotal movement of said plate, and a fluid pressure device responsive to bodily movement of said plate, said cables extending through the annular rim of said casing to emerge therefrom above said plate, said fluid pressure device including a piston actuated by bodily movement of said plate, and pressure transmitting tubes parallel with said cables and emerging therewith from the casing.

11. In a device of the character set forth, an annular casing of generally U-shaped peripheral cross-section defining a central hand opening, a control plate transversing said opening, means mounting said plate for both pivotal and bodily movement with respect to said casing including a bridge structure extending into said casing, control cables engaging said bridge structure to be moved in response to pivotal movement thereof, and a pressure chamber including a piston and plunger, said plunger engaging said plate to be moved upon bodily movement of said plate.

12. In a device of the character set forth, an annular casing of generally U-shaped peripheral cross-section defining a central hand opening, a control plate transversing said opening, means mounting said plate for both pivotal and bodily movement with respect to said casing including a bridge structure extending into said casing, control cables engaging said bridge structure to be moved in response to pivotal movement thereof, and a pressure chamber including a piston and plunger, said plunger engaging said plate to be moved upon bodily movement of said plate, together with a pressure tube for delivering pressure variations in response to movements of said piston.

13. In a device of the character set forth, an annular casing of generally U-shaped peripheral cross-section defining a central hand opening, a control plate transversing said opening, means mounting said plate for both pivotal and bodily movement with respect to said casing including a bridge structure extending into said casing, control cables engaging said bridge structure to be moved in response to pivotal movement thereof, and a pressure chamber including a piston and plunger, said plunger engaging said plate to be moved upon bodily movement of said plate, together with a pressure tube for delivering pressure variations in response to movements of said piston, the pressure tube and said cables extending upwardly from the bridge in the periphery of said casing.

14. In a device of the character set forth, an annular casing of generally U-shaped peripheral cross-section defining a central hand opening, a control plate transversing said opening, means mounting said plate for both pivotal and bodily movement with respect to said casing including a bridge structure extending into said casing, control cables engaging said bridge structure to be moved in response to pivotal movement thereof, and a pressure chamber including a piston and plunger, said plunger engaging said plate to be moved upon bodily movement of said plate, together with a pressure tube for delivering pressure variations in response to movements of said piston, the pressure tube and said cables extending upwardly from the bridge in the periphery of said casing and emerging in parallel relation therefrom.

15. In a device of the character set forth, an annular casing of generally U-shaped peripheral cross-section defining a central hand opening, a control plate transversing said opening, means mounting said plate for both pivotal and bodily movement with respect to said casing including a bridge structure extending into said casing, control cables engaging said bridge structure to be moved in response to pivotal movement thereof, and a pressure chamber including a piston and plunger, said plunger engaging said plate to be moved upon bodily movement of said plate, together with a pressure tube for delivering pressure variations in response to movements of said piston, the pressure tube and said cables extending upwardly from the bridge in the periphery of said casing and emerging in parallel relation therefrom above said plate.

References Cited in the file of this patent

UNITED STATES PATENTS 2,298,611     Bruderlin _____ Oct. 13, 1942